(12) United States Patent
Barthel

(10) Patent No.: US 10,668,869 B1
(45) Date of Patent: Jun. 2, 2020

(54) DEVICE HAVING A CAMERA UNIT AND A COVER ELEMENT

(71) Applicant: HUF HÜLSBECK & FÜRST GMBH & CO. KG, Velbert (DE)

(72) Inventor: Joachim Barthel, Essen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 11 days.

(21) Appl. No.: 16/315,994

(22) PCT Filed: Jun. 1, 2017

(86) PCT No.: PCT/EP2017/063265
§ 371 (c)(1),
(2) Date: Jan. 7, 2019

(87) PCT Pub. No.: WO2018/015058
PCT Pub. Date: Jan. 25, 2018

(30) Foreign Application Priority Data

Jul. 20, 2016 (DE) ........................ 10 2016 113 410

(51) Int. Cl.
*H04N 7/18* (2006.01)
*B60R 11/04* (2006.01)
(Continued)

(52) U.S. Cl.
CPC ............ *B60R 11/04* (2013.01); *G03B 11/043* (2013.01); *G03B 17/561* (2013.01);
(Continued)

(58) Field of Classification Search
CPC ...... H04N 7/18; H04N 5/2251; H04N 5/2257; B60R 11/04; B60R 2011/004;
(Continued)

(56) References Cited

U.S. PATENT DOCUMENTS 6,846,285 B2 * 1/2005 Hasegawa ............ A61B 1/0052
600/102
7,891,886 B2 * 2/2011 Schuetz .................. B60R 11/04
348/148
(Continued)

FOREIGN PATENT DOCUMENTS

DE  10 2007 052 402 A1  5/2009
DE  10 2010 060 573 A1  5/2012
(Continued)

OTHER PUBLICATIONS

International Preliminary Report on Patentability/Written Opinion of International Application Serial No. PCT/EP2017/063265, dated Jan. 22, 2019, 8 pages.
(Continued)

*Primary Examiner* — Trang U Tran
(74) *Attorney, Agent, or Firm* — Fay Sharpe LLP

(57) ABSTRACT

A camera unit for capturing images of the outer region of a motor vehicle includes a housing in which the camera unit is accommodated, a cover element, and a drive unit for moving the camera unit and for moving the cover element. A pivot element is movably mounted about a first axis of rotation and has a first arm, which is motionally connected to the cover element, and a second arm. A lever element, which is movably mounted about a second axis of rotation, is operatively connected to the cover element. A guide element, which is mounted about a third axis of rotation, includes a first guide arm that is operatively connected to the second arm of the pivot element and a second guide arm which is motionally coupled to the camera unit.

15 Claims, 3 Drawing Sheets

(51) Int. Cl.
    *G03B 11/04*     (2006.01)
    *G03B 17/56*     (2006.01)
    *H04N 5/225*     (2006.01)
    *B60R 11/00*     (2006.01)

(52) U.S. Cl.
    CPC ......... *H04N 5/2251* (2013.01); *H04N 5/2257* (2013.01); *B60R 2011/004* (2013.01); *B60R 2011/0089* (2013.01); *B60R 2011/0092* (2013.01)

(58) Field of Classification Search
    CPC .... B60R 2011/0089; B60R 2011/0092; G03B 11/043; G03B 17/561
    USPC ........................................................ 348/148
    See application file for complete search history.

(56) References Cited

U.S. PATENT DOCUMENTS

| | | | | |
|---|---|---|---|---|
| 8,545,114 B2 * | 10/2013 | Pavithran | ............ | H04N 5/2253 396/448 |
| 8,821,043 B2 * | 9/2014 | Schutz | ............ | B60R 11/04 396/419 |
| 8,961,044 B2 * | 2/2015 | Barthel | ............ | B60R 11/04 396/428 |
| 9,260,909 B2 * | 2/2016 | Kaga | ............ | E06B 7/22 |
| 9,718,414 B2 * | 8/2017 | Da Deppo | ............ | B60R 11/04 |
| 9,725,049 B2 * | 8/2017 | Buschmann | ............ | B60R 11/04 |
| 9,751,471 B2 * | 9/2017 | Schutz | ............ | B60R 11/04 |

FOREIGN PATENT DOCUMENTS

| | | |
|---|---|---|
| DE | 10 2012 109 610 A1 | 4/2014 |
| DE | 10 2016 014 844 A1 | 6/2017 |
| WO | WO 2016/177577 A1 | 11/2016 |

OTHER PUBLICATIONS

International Search Report of International Application Serial No. PCT/EP2017/063265, dated Sep. 8, 2017, 6 pages.

* cited by examiner

DEVICE HAVING A CAMERA UNIT AND A COVER ELEMENT

BACKGROUND

The invention is directed to a device having a camera unit comprising a lens for capturing images of the surrounding area of a motor vehicle, a housing which comprises at least one opening for the camera unit and in which the camera unit is accommodated, a cover element for closing the opening in the housing, a drive unit which is designed for moving the camera unit between a rest position and an operating position and for moving the cover element between a closed position and an open position, the camera unit being arranged in the rest position, within the housing and behind the cover element, so as to be inaccessible from the outside, when the cover element is in the closed position, and the camera unit being arranged in the operating position when the cover element is in the open position, a pivot element being movably mounted about a first rotational axis and comprising a first arm, which is connected for movement to the cover element, and a second arm, and a lever element, which is movably mounted about a second rotational axis, being operatively connected to the cover element in order to assist the movement of the cover element.

Devices comprising a camera unit, which are used for capturing images of the surrounding area of a motor vehicle, are known from the prior art. Devices of this kind comprise a camera unit which is received in a housing of the camera unit so as to be movable between a rest position and an operating position. For example, camera units of this kind may be used in the field of assisted parking of motor vehicles. If the reverse gear of the motor vehicle is selected for example, the camera unit moves from the rest position into the operating position, the camera unit being extended out of the housing at least in part. As a result, images of the area behind the motor vehicle are captured by the camera unit and shown to the driver of the motor vehicle on a display. If the reverse travel has ended and the driver of the motor vehicle deselects the reverse gear, the camera unit is moved from the operating position back into the rest position again.

In order to protect the camera unit from contamination at least in the rest position, a cover element is provided, by means of which the opening through which the camera unit extends out the housing can be closed in the rest position. Consequently, during the transition from the rest position into the operating position of the camera unit, the cover element must at the same time be moved between a closed position and an open position.

A device of the type described at the outset is known for example from DE 10 2010 060 573 A1. In the case of this known device, a camera unit is accommodated in a housing so as to be movable by means of a carriage element to which the camera unit is fastened. In this case, a drive unit moves the camera unit by means of a mechanism that comprises a pivot element and a lever element. The pivot element is L-shaped and is rotatable about a central rotational axis, a first longitudinal end of the pivot element being hingedly connected to the cover element, whereas the second longitudinal end of the pivot element comprises a long hole, on which the camera unit is mounted. The lever element is mounted on a further rotational axis and is hingedly connected to the cover element in order to guide the movement of the cover element.

Furthermore, DE 10 2007 052 402 discloses a device comprising a camera unit, which is used for capturing images of the surrounding area of a motor vehicle. The movement of the camera unit and the movement of the cover element relative to the camera unit comprise a plurality of movement steps, and therefore complex kinematic control of the cover element is necessary. In particular, the device disclosed herein requires significant installation space for moving the camera unit and the cover element.

Against this prior art, the object of the invention is that of providing a solution which provides a device having a camera unit and a cover element in a simple and cost-effective manner, which device requires less installation space and is at the same time characterized by a movement path for the camera unit and cover element which is kept small, as a result of which the time for moving the camera unit into the operating position thereof can be kept short.

BRIEF SUMMARY

In the case of a device of the type mentioned at the outset, the object is achieved according to the invention in that a guide element which is mounted about a third rotational axis comprises a first guide arm which is operatively connected to the second arm of the pivot element, and a second guide arm which is movably connected to the camera unit, in order to move the camera unit and in order to move the cover element the drive unit engaging on the camera unit which is operatively connected to the second guide arm.

Advantageous and expedient embodiments and developments of the invention can be found in the dependent claims.

The invention provides a device having a camera unit for capturing images of the surrounding area of a motor vehicle, which device is characterized by a functional design and cost-effective construction. According to the invention, the drive unit moves the camera unit, the guide element, which is designed in the manner of a lever and is movably connected to the camera unit, transmitting the movement of the camera unit to the pivot element, such that the cover element is also moved at the same time as the camera unit is moved, only one drive unit being required for both movements of the camera unit and of the cover element. The movement of the camera unit from the rest position thereof into the operating position extends in an almost linear manner, although no carriage elements are used as in the prior art, but instead merely a lever-like mechanism. The linear movement of the camera unit between the rest position and the operating position brings about a compact movement path in a very small space. Consequently, the space for receiving the camera unit can be reduced to a minimum by means of the invention, the device having a simple design and little installation space. Owing to the compact movement path of the camera unit during the movement thereof between the rest position and the operating position, the time for extending the camera unit can be reduced to a minimum by means of the invention.

According to an embodiment of the invention, a coupling element hingedly interconnects the first guide arm of the guide element and the second arm of the pivot element. The hinged connection means that both the guide element and the pivot element can rotate or pivot significantly about the rotational axis thereof in each case, but the installation space for the device according to the invention can be kept small by means of the coupling element.

In order, in the event of a vehicle accident, to prevent the acceleration forces acting during the accident from moving the camera unit into the operating position, according to the invention the coupling element is aligned with the guide element when the camera unit is in the rest position. This arrangement ensures that no leverage can act on the guide element and the coupling element, and therefore the aligned arrangement alone of the guide element and coupling element constitutes a form of crash prevention means.

In order to ensure that the camera unit also travels a linear path in its movement between the rest position and the operating position, according to a further embodiment of the invention a motion lever is movably mounted about a fourth rotational axis and is operatively connected to the camera unit in order to assist the movement of the camera unit. In this way, less installation space is required for the device according to the invention.

Also in view of a compact structure of the device, according to a further embodiment of the invention the first rotational axis and the second rotational axis are arranged between the third rotational axis and the fourth rotational axis with respect to the movement direction of the camera unit.

With respect to a small installation volume and consequently a linear movement of the camera unit, according to an embodiment of the device according to the invention the second guide arm is designed lever-like, the motion lever and the second guide arm having the same orientation and extending so as to be mutually parallel.

The cover element may comprise a manufacturer's emblem which, if possible, should always be clearly visible, both in the closed position and in the open position. Therefore, the cover element should be aligned so as to be more or less always in parallel with the adjoining vehicle body. For this purpose, according to a further embodiment of the invention the first arm comprises a first hinge point on the cover element and the lever element comprises a second hinge point on the cover element, the spacing between the first rotational axis and the second rotational axis corresponding to the spacing between the first hinge point and the second hinge point.

According to a further embodiment of the device according to the invention, the spacing between the fourth rotational axis and the cover element is smaller than the spacing between the third rotational axis and the cover element. The fourth rotational axis, and thus the lever element, are therefore arranged between the cover element and the third rotational axis, on which the guide element is mounted.

In order to achieve a particularly compact arrangement, according to an embodiment of the invention the first arm extends at an angle with respect to the second arm. Although the first rotational axis is arranged behind the fourth rotational axis with respect to the cover element, the angled design of the pivot element allows for a connection to the cover element.

In order that the cover element does not wobble or hang loose but is instead retained very securely, according to a further embodiment of the invention the pivot element comprises a third arm which is mounted on the first rotational axis so as to have a parallel offset relative to the first arm and is movably connected to the cover element.

According to a further embodiment, the compact structure of the device according to the invention is characterized in that the lever element is arranged between the first arm and the third arm of the pivot element such that the cover element is mounted on the first arm, the third arm and the lever element at three hinge points. Mounting by means of three hinge points furthermore prevents the cover element from wobbling or hanging loose or tilting.

According to a further embodiment of the invention, a spindle nut, which moves along a spindle accommodated in the housing, is fixed to the camera unit, the drive unit driving and rotating the spindle. Consequently, the camera unit is moved on a linear path along or at least in the axial direction of the spindle by the movement of the spindle nut.

In order to prevent adjustment of the drive unit, it is advantageous for the spindle and/or the spindle nut to consist of a plastics material. A thermoplastic polymer is preferably used, owing to the advantageous properties thereof. As a result, a spindle and/or a spindle nut having a pitch that is adjusted to the system of the device can be produced by means of cost-effective production. For example, a larger pitch can accelerate the extension and retraction of the camera unit without the need to use a stronger drive unit for this purpose.

In order to increase the functionality of the device, according to a further embodiment of the invention the cover element is designed in the manner of a tactile switch. Consequently, the cover element comprises a base plate to which for example a microswitch is attached, which microswitch can be actuated by means of pressing a switch that is above the microswitch and is resiliently supported on the base plate, for example in order to bring about unlocking or opening of a trunk hatch.

It is expedient, in an embodiment of the device, for the pivots to be mounted on the housing in a stationary manner. In this respect, it is noted that, within the meaning of the invention, a housing is also to be understood to mean a carrier assembly, in or on which the device according to the invention comprising the camera unit, cover element and movement mechanism is received, and which can be installed in the vehicle body, as well as a recess in the vehicle body in which the device according to the invention comprising the camera unit, cover element and movement mechanism can be inserted and mounted. The function of the housing is simply that of accommodating the device comprising the camera unit, cover element and movement mechanism.

Likewise, within the meaning of the invention, a rotational axis and a hinge point are to be understood to be connection or mounting regions about which something mounted thereon can rotate. This need not be a shaft within the meaning of a rod-shaped element or a driven rod. The rotational axis and hinge points of the present invention may even also be pivots and hinged shafts on which an element is rotatably mounted or attached at points.

Furthermore, the motion lever and the guide element of the present invention may be lever-like arms which are attached to just one side of the camera unit, by means of attachment at points, and extend there. Equally, the present invention is not intended to be restricted to this interpretation, because the motion lever and the guide element may be two-armed or double-armed elements which are arranged on either side of the camera unit and extend so as to be mutually parallel.

Of course, the features that have been mentioned above and will be explained more in the following can be used not only in the combination specified in each case, but rather also in other combinations or in isolation, without departing from the scope of the present invention. The scope of the invention is defined only by the claims.

BRIEF DESCRIPTION OF THE DRAWINGS

Further details, features and advantages of the subject matter of the invention can be found in the following description in conjunction with the drawings which show a preferred embodiment of the invention by way of example.

In the drawings.

DETAILED DESCRIPTION

Figure 1:
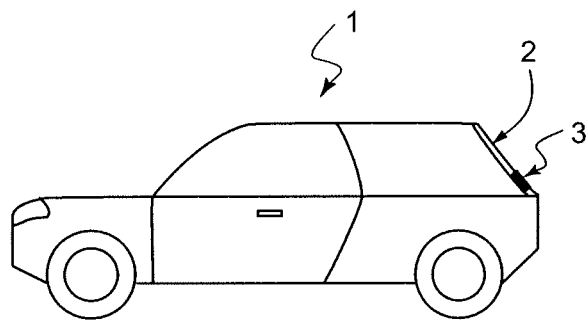
FIG. 1 is a schematic view of a motor vehicle comprising a device according to the invention that is indicated by way of example.

FIG. 1 is a side view of a motor vehicle 1 which comprises a device 3 according to the invention (shown schematically) on the tail 2 thereof (alternatively also on the bumper thereof). The device 3 is used for capturing images of the surrounding area of the motor vehicle 1.

Figure 2:
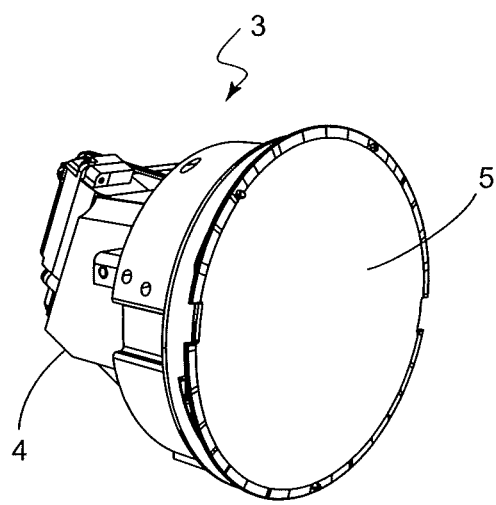
FIG. 2 is a perspective view of a device according to the invention, in which a cover element is arranged in a closed position.
Figure 3:
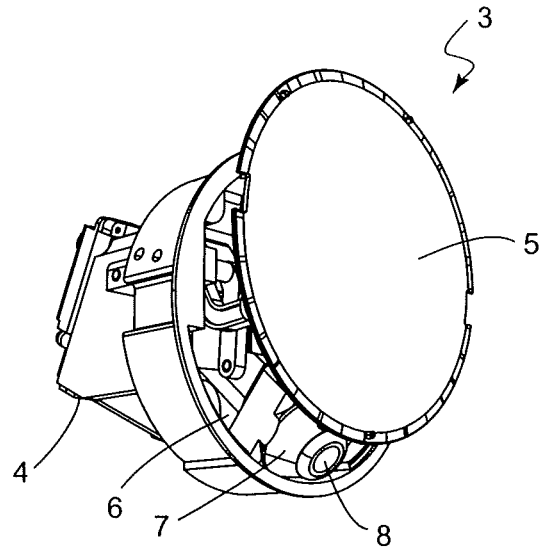
FIG. 3 is a perspective view of the device according to the invention, in which a cover element is arranged in an open position and a camera unit is arranged in an operating position.

FIGS. 2 and 3 are perspective views of the device 3, a housing 4 of the device 3 being shown in FIG. 2, which housing is closed at the end face by a cover element 5 belonging to the device 3. In the arrangement shown in FIG. 2, the cover element 5 is in the closed position thereof (see also FIG. 7 which is a lateral cross section of the device 3). In contrast, in FIG. 3 the cover element 5 is arranged in an open position, in which the cover element 5 releases an opening 6 formed in the end face of the housing 4 at least in part (see also FIG. 8 which is a lateral cross section of the device 3). In the open position of the cover element 5, a camera unit 7 of the device 3 protrudes out of the opening 6. More precisely, when the cover element 5 is in the open position, the camera unit 7 is arranged in an operating position in which a lens 8 of the camera unit 7 can capture the surrounding area of the motor vehicle 1. In FIG. 2, the camera unit 7 is in a rest position, retracted into the housing 4, and is covered by the cover element 5 and arranged so as to be protected from environmental influences such as rain, dust, sunlight and dirt, and also from possible theft. In the device 3 according to the present invention, the movement of the camera unit 7 and the cover element 5 is coupled such that the camera unit 7 is arranged in the rest position, within the housing 4 and behind the cover element 5, so as to be inaccessible from the outside, when the cover element 5 is in the closed position, and the camera unit 7 is arranged in the operating position when the cover element 5 is in the open position. The cover element 5 is moved by means of the same mechanism that moves the camera unit 7.

Figure 4:
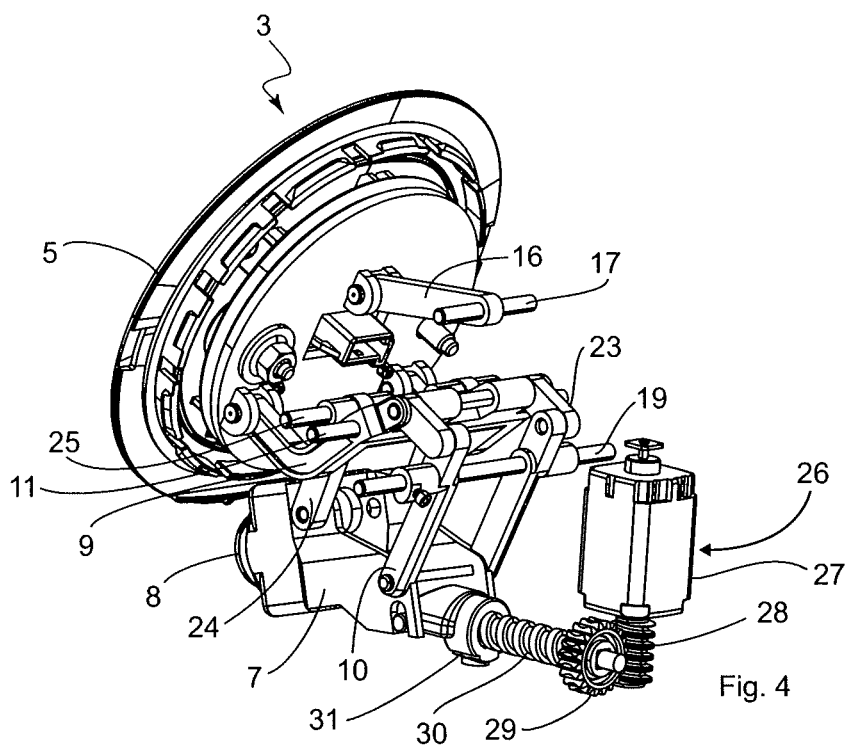
FIG. 4 is a further perspective view of the device shown in FIGS. 2 and 3, a housing of the device not being shown.
Figure 6:
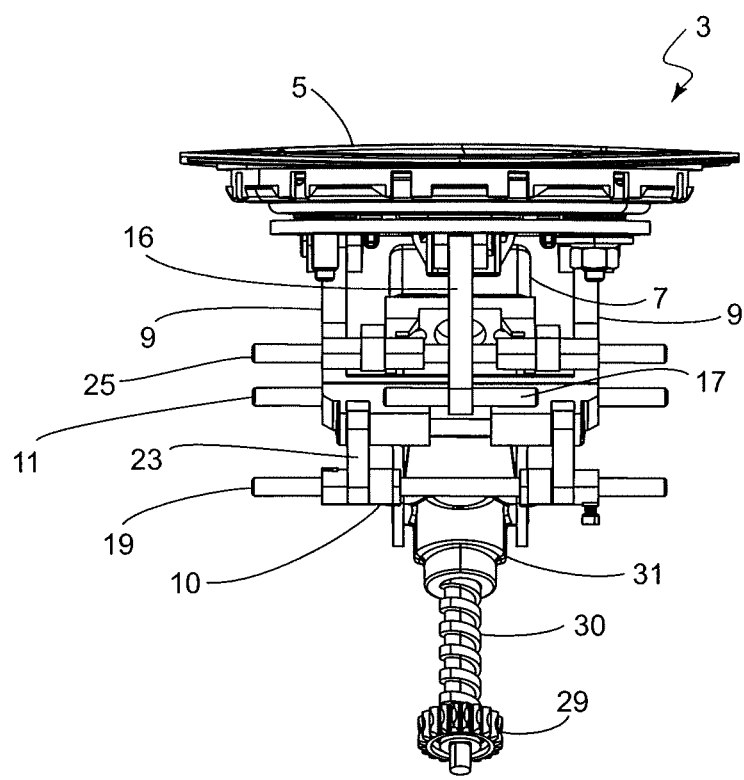
FIG. 6 is a plan view of the device according to the invention shown in FIG. 4.
Figure 8:
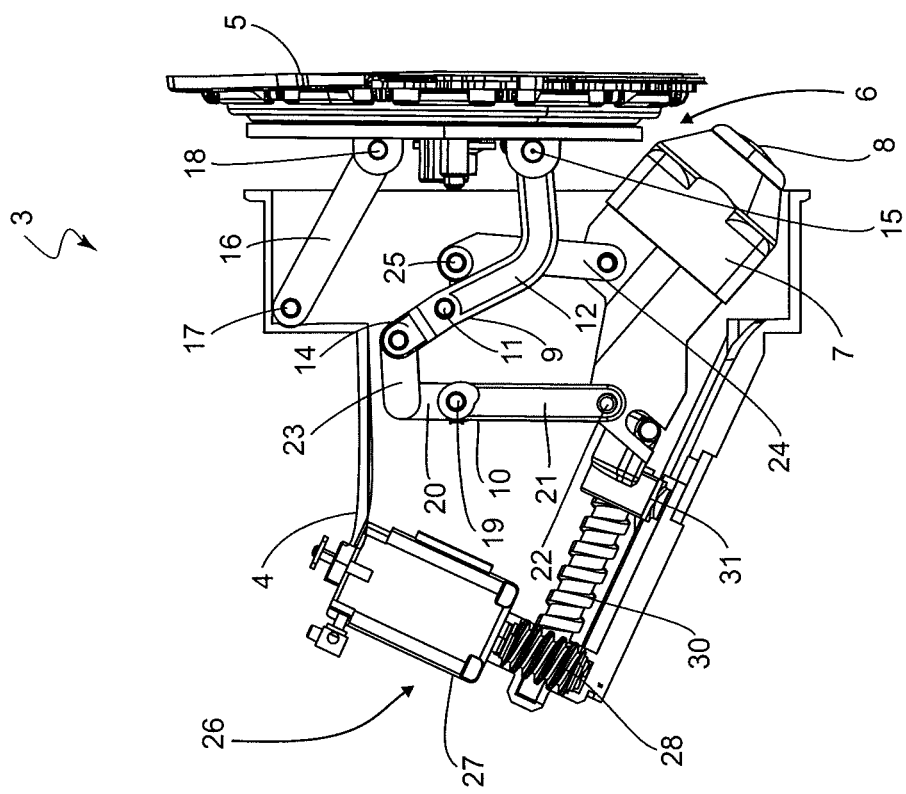
FIG. 8 is a side view of the device according to the invention, in which the camera unit is arranged in the operating position.
Figure 7:
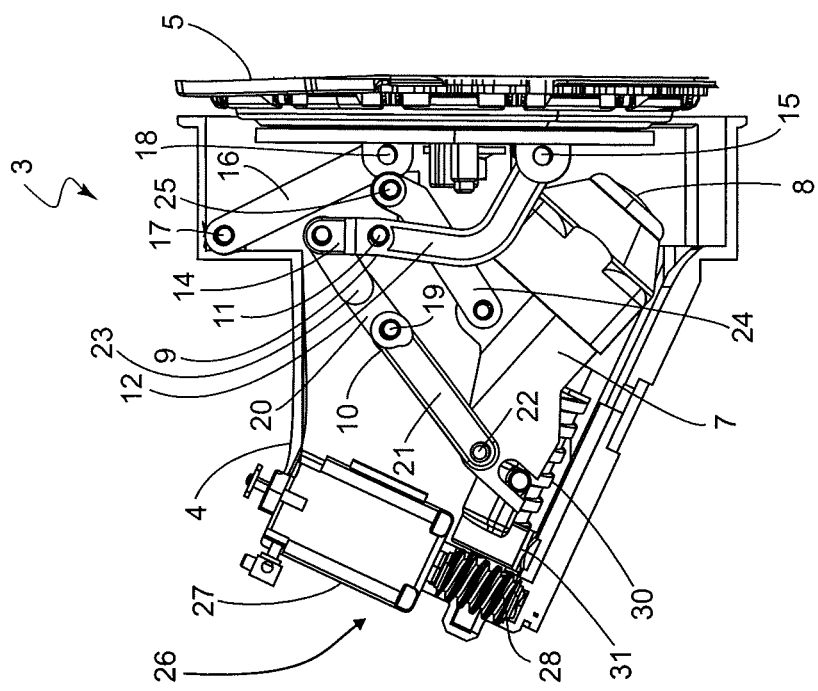
FIG. 7 is a side view of the device according to the invention, in which the camera unit is arranged in a rest position.

The housing 4 for the device 3 is not shown in FIGS. 4 and 6 and is cut away in part in FIGS. 7 and 8 in order to achieve a better view of a mechanism for moving the cover element 5 and the camera unit 7. In order to move the camera unit 7 and the cover element 5 simultaneously, the mechanism of the device 3 comprises a pivot element 9, a guide element 10 that is coupled to the pivot element 9, and a lever element 16. As can be seen in particular from FIGS. 7 and 8, the pivot element 9 is mounted so as to be rotatable about a first rotational axis 11, the pivot element 9 comprising a first arm 12 and a second arm 14. The first arm 12 extends from the rotational axis 11 and is angled, the longitudinal end thereof being rotatably connected to the cover element 5 at a hinge point 15. The rod-like lever element 16 is rotatably mounted on a second rotational axis 17 by one of the two longitudinal ends thereof, whereas the other longitudinal end is rotatably connected to the cover element 5 at a further hinge point 18. Furthermore, the guide element 10 is mounted so as to be rotatable about a third rotational axis 19 and comprises a first guide arm 20 and a second guide arm 21 that extends so as to be aligned with the first guide arm 20. The second guide arm 21 is coupled for movement to the camera unit 7 by means of a hinge point 22, as will be described in more detail below. The device 3 further comprises a rod-like coupling element 23 which hingedly interconnects the first guide arm 20 of the guide element 10 and the second arm 14 of the pivot element 9. The first guide arm 20 is consequently operatively connected to the second arm 14 of the pivot element 9 by means of the coupling element 23. The device 3 further comprises a motion lever 24 which is movably mounted about a fourth rotational axis 25 and is operatively connected to the camera unit 7.

Figure 5:
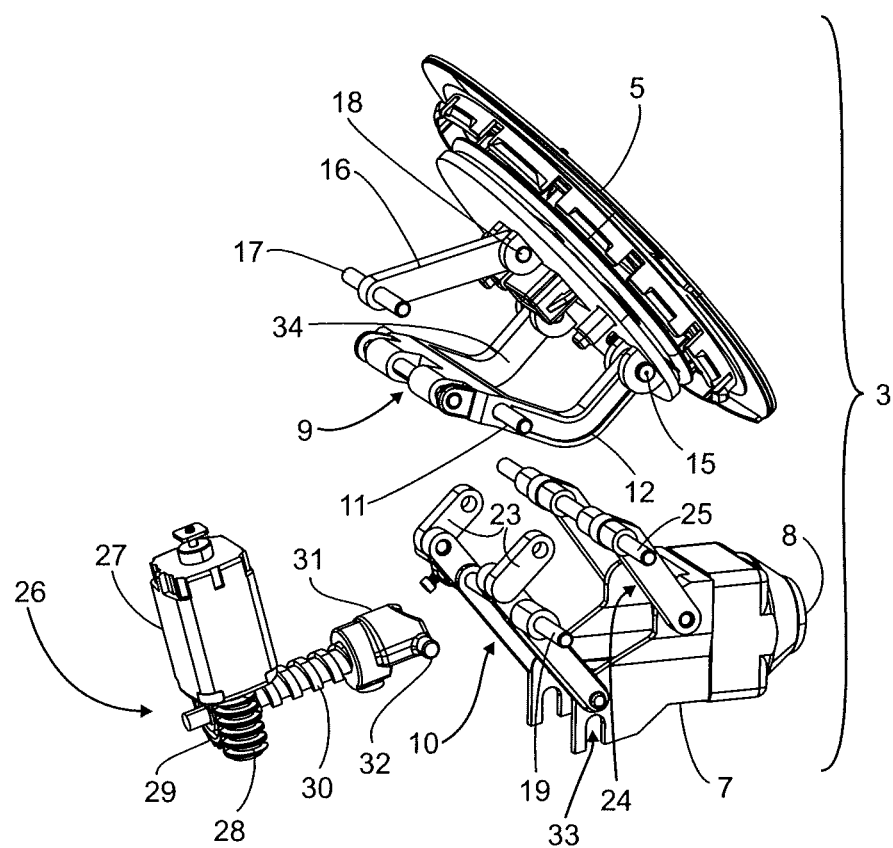
FIG. 5 is a perspective exploded view of the device shown in FIG. 4.

The device 3 according to the invention further comprises a drive unit 26 which is used for moving the camera unit between the rest position and the operating position and is accommodated within the housing 4. The drive unit 26 includes a motor or a rotating motor 27 comprising a drive shaft 28 which meshes with a gear wheel 29 that is rotationally fixed to a spindle 30. A spindle nut 31 is coupled to the camera unit 7, lateral pins 32 on the head of the spindle nut 31 engaging in corresponding recesses 33 on the housing of the camera unit 7 (see for example FIG. 5). When the rotating motor 27 is started up, the spindle nut 31 moves along the spindle 30 that is accommodated in the housing 4, the spindle nut 31 moving either towards the cover element 5 (camera unit 7 is moved out of the rest position and into the operating position) or away from the cover element 5 (camera unit 7 is moved out of the operating position and into the rest position), depending on the direction of rotation of the rotating motor 27. In this case, according to the invention the spindle 30 and/or the spindle nut 31 is produced from a plastics material, which may take place in a known injection-molding process for example. The production method makes it possible to adjust the pitch of the spindle 30 to the desired fringe conditions (for example the speed at which the camera unit 7 is moved into the operating position thereof) of the device 3. When the camera unit 7, arranged in the rest position thereof, is intended to be brought into operation, the rotating motor 27 is started. The rotating motor 27 rotates the spindle 30 by means of the drive shaft 28 and the gear wheel 29, such that the spindle nut 31 moves along the spindle 30 towards the cover element 5. In the process, the spindle nut 31 also urges the camera unit 7 towards the cover element 5, as a result of which the lever-like guide element 10 rotates about the third rotational axis 19 in a counter-clockwise direction. In this case, the first guide arm 20 pulls the coupling element 23 in a direction oriented away from the cover element 5, as a result of which the pivot element 9 also rotates about the first rotational axis 11 in a counter-clockwise direction, such that the first arm 12 of the pivot element 9 presses against the cover element 5 and moves said element outwards and away from the first rotational axis 11. In this case, the above-described movement of the cover element 5 out of the closed position and into the open position is assisted by the lever element 16, the lever element 16 itself not being force-connected to the drive unit 26. Neither is the motion lever 24 force or operatively connected to the drive unit 26. In this case, the motion lever is used merely to assist the movement of the camera unit 7. Only the pivot element 9 is force and operatively connected to the drive unit 26 by means of the coupling element 23 and the guide element 10, a movement of the camera unit 7 bringing about a movement of the cover element 5 because, in order to move the camera unit 7 and in order to move the cover element 5 the drive unit 26 engages on the camera unit 7 which is coupled for movement to the second guide arm 21.

The cover element 5 may carry a vehicle emblem. In order for an emblem to be clearly visible at all times, the cover element 5 must be oriented so as to be more or less in parallel with the vehicle body, irrespective of whether the cover element 5 is in the closed position (see FIG. 7) or in the open position (see FIG. 8). In order to achieve this orientation, the spacing between the first rotational axis 11 and the second rotational axis 17 corresponds to the spacing between the first hinge point 15 and the second hinge point 18.

The four rotational axis 11, 17, 19 and 25 are mounted on the housing 4 so as to be stationary. As an be seen in particular from FIGS. 7 and 8, when viewed in lateral cross section the first rotational axis 11 and the second rotational axis 17 are arranged between the third rotational axis 19 and the fourth rotational axis 25 with respect to the movement direction of the camera unit 7. In this case, the spacing between the fourth rotational axis 25 and the cover element 5 is smaller than the spacing between the third rotational axis 19 and the cover element 5. In other words, the fourth rotational axis 25, and therefore the motion lever 24, is arranged closer to the cover element 5 than the third rotational axis 19 comprising the guide element 10. As is furthermore characteristic of the device 3 according to the invention, the second guide arm 21 is lever-like or rod-like, the motion lever 24 and the second guide arm 21 having the same orientation and extending so as to be mutually parallel.

As can be seen in FIG. 7, in the rest position of the camera unit 7 and in the closed position of the cover element 5, the coupling element 23 is aligned with the guide element 10. As a result, the device 3 has the property of a crash prevention means because no leverage can act on the guide element 10 which could cause the camera unit 7 to move out of the rest position and into the operating position, and thus the cover element 5 to move into the open position.

In principle, the above assembly consisting of the pivot element 9, guide element 10 and motion lever 24 is also conceivable as a single-arm lever configuration, as is shown in the lateral cross sections of FIGS. 7 and 8. However, in order to increase the stability and robustness of the device 3, the pivot element 9, the guide element 10 and the motion lever 24 are in each case formed as pairs. This means that, in the illustrations shown in FIGS. 7 and 8, a further pivot element 9, a further guide element 10 and a further motion lever 24 are congruent but in parallel in the direction of the width of the camera unit 7, which can be seen in particular from the drawings in FIGS. 5 and 6. Accordingly, the pivot element 9 for example comprises a third arm 34 (see for example FIG. 5) which is mounted on the first rotational axis 11 so as to have a parallel offset relative to the first arm 12 and is connected for movement to the cover element 5. In this manner, the lever element 16 is arranged between the first arm 12 and the third arm 34 of the pivot element 9 (see FIGS. 5 and 6) such that the cover element 5 is mounted on the first arm 12, the third arm 34 and the lever element 16 at three hinge points and hanging loose or tilting of the cover element 5 is thus reliably prevented.

In order to increase the functionality of the device 3 according to the invention, the cover element 5 may be designed in the manner of a tactile switch. A cover element 5 of this kind is known for example from DE 10 2010 061 455 A1, to which reference is made at this point. The cover element 5 formed in the manner of a tactile switch comprises a base plate to which for example a microswitch is attached, which microswitch is actuated by means of pressing a switch that is above the microswitch and is resiliently supported on the base plate, for example in order to unlock or open a trunk hatch.

In summary, the device 3 according to the invention comprises the camera unit 7 having a lens 8 for image capturing of the surrounding area of the motor vehicle 1, the housing 4 which comprises the opening 6 for the camera unit 7 and in which the camera unit 7 is accommodated, the cover element 5 for closing the opening 6 in the housing 4, and the drive unit 26 which is designed for moving the camera unit 7 between the rest position and the operating position and for moving the cover element 5 between the closed position and the open position. When the cover element 5 is in the closed position, the camera unit 7 is arranged in the rest position, within the housing 4 and behind the cover element 5, so as to be inaccessible from the outside, and when the cover element 5 is in the open position the camera unit 7 is arranged in the operating position. The pivot element 9 is furthermore movably mounted about the first rotational axis 11 and comprises the first arm 12, which is connected for movement to the cover element 5, and the second arm 14. The lever element 16, which is movably mounted about the second rotational axis 17, is operatively connected to the cover element 5 in order to assist the movement of the cover element 5. The guide element 10 which is mounted about the third rotational axis 19 comprises the first guide arm 20 which is operatively connected to the second arm 14 of the pivot element 9, and the second guide arm 21 which is coupled for movement to the camera unit 7. It is characteristic of the invention that, in order to move the camera unit 7 and in order to move the cover element 5, the drive unit 26 engages on the camera unit 7 which is coupled for movement to the second guide arm 21. The drive unit 26 therefore moves the camera unit 7 between the rest position and the operating position, the cover element 5 being coupled for movement to the camera unit 7 by means of the pivot element 9 and the guide element 10, i.e. when the camera unit 7 is arranged in the rest position, the cover element 5 is arranged in the closed position, whereas the cover element 5 is arranged in the open position when the camera unit 7, moved by the drive unit 26, is arranged in the operating position.

The invention described above is of course not restricted to the embodiment described and illustrated. It is clear that a number of modifications which are obvious to a person skilled in the art in accordance with the intended use can be made to the embodiment shown in the drawings, without thereby departing from the scope of the invention. The invention covers everything contained in the description and/or shown in the drawings, including that which is obvious to a person skilled in the art, diverging from the specific embodiment.

The invention claimed is:

1. A device comprising:
   a camera unit comprising a lens for capturing images of the surrounding area of an associated motor vehicle, a housing which comprises at least one opening for the camera unit and in which the camera unit is accommodated, a cover element for closing the opening in the housing, and a drive unit which is designed for moving the camera unit between a rest position and an operating position and for moving the cover element between a closed position and an open position, the camera unit being arranged in the rest position, within the housing and behind the cover element, so as to be inaccessible from the outside, when the cover element is in the closed position, and the camera unit being arranged in the operating position when the cover element is in the open position, a pivot element which is movably mounted about a first rotational axis and comprising a first arm, which is connected for movement to the cover element, and a second arm, a lever element, which is movably mounted about a second rotational axis, the lever element being operatively connected to the cover element in order to assist the movement of the cover element, wherein a guide element which is mounted about a third rotational axis comprises a first guide arm which is operatively connected to the second arm of the pivot element, and a second guide arm which is movably connected to the camera unit, wherein in order to move the camera unit and in order to move the cover element, the drive unit engages on the camera unit which is movably connected to the second guide arm.

2. The device according to claim 1, wherein a coupling element hingedly interconnects the first guide arm of the guide element and the second arm of the pivot element.

3. The device according to claim 2, wherein in the rest position of the camera unit, the coupling element is aligned with the guide element.

4. The device according to claim 1, wherein a motion lever is movably mounted about a fourth rotational axis and is operatively connected to the camera unit in order to assist the movement of the camera unit.

5. The device according to claim 4, wherein the first rotational axis and the second rotational axis are arranged between the third rotational axis and the fourth rotational axis with respect to the movement direction of the camera unit.

6. The device according to claim 4, wherein the second guide arm is lever-like, the motion lever and the second guide arm having the same orientation and extending so as to be mutually parallel.

7. The device according to claim 4, wherein the first arm comprises a first hinge point on the cover element and the lever element comprises a second hinge point on the cover element, the spacing between the first rotational axis and the second rotational axis corresponding to the spacing between the first hinge point and the second hinge point.

8. The device according to claim 4, wherein a spacing between the fourth rotational axis and the cover element is smaller than a spacing between the third rotational axis and the cover element.

9. The device according to claim 1, wherein the first arm extends at an angle with respect to the second arm.

10. The device according to claim 1, wherein the pivot element comprises a third arm which is mounted on the first rotational axis so as to have a parallel offset relative to the first arm and is movably connected to the cover element.

11. The device according to claim 10, wherein the lever element is arranged between the first arm and the third arm of the pivot element such that the cover element is mounted on the first arm, the third arm and the lever element at three hinge points.

12. The device according to claim 1, wherein a spindle nut, which moves along a spindle accommodated in the housing, is fixed to the camera unit, the drive unit driving and rotating the spindle.

13. The device according to claim 12, wherein the spindle and/or the spindle nut consists of a plastics material.

14. The device according to claim 1, wherein the cover element is designed in the manner of a tactile switch.

15. The device according to claim 1, wherein the first, second and third rotational axes are mounted on the housing so as to be stationary.

* * * * *